United States Patent [19]

Kopp et al.

[11] Patent Number: 4,470,637
[45] Date of Patent: Sep. 11, 1984

[54] VEHICLE WHEEL WITH SEGMENTAL RIM PARTS AND RETAINING RING

[75] Inventors: Hans Kopp, Uhwiesen; Max Widmer, Beringen, both of Switzerland

[73] Assignee: Georg Fischer A.G., Schaffhausen, Switzerland

[21] Appl. No.: 413,509

[22] Filed: Aug. 31, 1982

[51] Int. Cl.$^3$ .......................... B60B 11/06; B60B 1/06
[52] U.S. Cl. .............................. 301/11 R; 301/13 SM; 301/19; 301/23
[58] Field of Search .............. 301/11 R, 12 R, 13 SM, 301/23, 30-32, 18, 19, 20, 22

[56] References Cited

U.S. PATENT DOCUMENTS

| 2,062,722 | 12/1936 | Mijnssen. | |
|---|---|---|---|
| 3,199,920 | 8/1965 | Hurst | 301/13 SM |

FOREIGN PATENT DOCUMENTS

| 2218168 | 11/1972 | Fed. Rep. of Germany | 301/13 SM |
|---|---|---|---|
| 815529 | 7/1937 | France | 301/13 SM |
| 1528409 | 6/1968 | France | 301/13 SM |
| 144737 | 4/1931 | Switzerland. | |
| 175208 | 2/1935 | Switzerland. | |
| 482559 | 1/1970 | Switzerland | 301/13 SM |
| 346913 | 4/1931 | United Kingdom. | |
| 449145 | 6/1936 | United Kingdom | 301/13 SM |

Primary Examiner—David A. Scherbel
Attorney, Agent, or Firm—Ernest F. Marmorek

[57] ABSTRACT

A vehicle wheel, of the type that carries a tubed tire includes a wheel body, a rim which has a plurality of segmental rim parts, a solid retaining ring which engages all of the rim parts along one side thereof, cam and cam follower means between the rim parts and the wheel body which, when powered, urge the rim parts outwardly, and a power device connected to the wheel body which is capable of actuating the cam and cam follower to urge the rim parts radially outwardly into a final position, wherein there is established an equilibrium between the urging force applied to the rim parts from the power device, and, respectively, a restraining force applied to the rim parts by the ring due to its tensile stress.

10 Claims, 10 Drawing Figures

VEHICLE WHEEL WITH SEGMENTAL RIM PARTS AND RETAINING RING

BACKGROUND OF THE INVENTION

When mounting a tire on a wheel, the tire is usually seated in a rim. The rim can either be endless, or divided, namely consist of a plurality, for example three segmental rim parts.

Where endless rims are used, a tire may not be safely mounted on the rim. The disadvantage of endless rims, however, is the fact that the tire cannot be easily assembled and disassembled from the rim, and special tools or machinery is needed to mount a tire on an endless rim, or once mounted, to remove the tire from the rim.

Another type of rim consists of a plurality, for example three segmental rim parts. While it is easy to mount a tire on segmental rim parts, and once mounted, to install the tire rim assembly on the wheel body.

A rim using a plurality of segmental rim parts is disclosed, for example in U.S. Pat. No. 2,062,722 issued to Mijnssen, assigned to the instant assignee, based on Swiss Pat. No. 175,208.

Mijnssen teaches that the inner circumference of the rim is provided laterally of the middle plane thereof with a beveled seating face which rests against a matching, conical seating face on the heads of the spokes or arms of a spider-shaped wheel body. The heads of the spokes carry bolts provided with clips which, on one hand, bear against their respective head, and, on the other hand against the front side of a seating projection providing at its blunt end the seating faces of the rim. As shown, for example, in FIG. 1 of the above-noted Mijnssen patent, segmental rim parts 5, 6, and 7 are clearly seen in FIG. 1. If a tire is mounted on a rim consisting of such a plurality of rim parts, 5, 6 and 7, and air is pumped into the tire, the pressure of the tire causes the rim parts to abut one another so as to substantially close the gaps 8 shown in FIG. 1. When an air-inflated tire is mounted on the rim, the resulting change in the diameter of the rim due to compression by the force of the tire is at least partially cancelled by a radially outward pressure being exerted on the rim. The resulting pressure may result, however, in the rim being expanded too much. To prevent such undue expansion, the wheel body for segmental rim parts of this type is provided with stop-means or clamping-means, which largely prevent the segmental rim parts from becoming unintentionally loose from the wheel body.

While the afore-mentioned Mijnssen uses a nut and bolt arrangement and a plurality of clips to secure the wheel body to the rim, British Pat. No. 346,913 based on Swiss Pat. No. 144,737, also assigned to the instant assignee, uses an endless holding or clamping ring provided with a plurality of holes, and including at least one annular laterally extending projection to mate with a corresponding groove in the segmental rim parts. A plurality of bolts 15 are threaded into the wheel body 13, and once in place in the wheel body 13, receive the ring 14, the bolt 15 projecting through corresponding holes in the ring 14. Finally nuts are threaded onto the bolts, so as to clamp the ring 14 to the wheel body 13 and to the rim 1.

It will be seen that the trend in the views is to provide lateral stop means, so that when the nuts, threaded onto respective bolts 15, are tightened the lateral extension 19 abuts a corresponding flat portion of an annular groove, in, for example the rim 1. In several embodiments, in addition to the ring 14 being provided with a lateral extension, the wheel body 13 is also provided with a lateral extension, for example extension 21 shown in FIG. 5, both lateral extensions embracing a radially inward projection of the rim 1 to insure that the rim 1 is clamped between the ring 14 and the wheel body 13. In the embodiment shown in FIG. 4, where only a single laterally facing annular extension 19 is provided on the ring 14, it will be observed that a clearance exists between the extension 19 and the rim 1. Thus when the nut is tightened on the bolt 15, in the event the rim 1 slides laterally leftwards from the facing 11, the effect of the clearance in the groove of the rim 1 is to avoid stressing the relatively weak ring 14. The holding mechanism therefore secures the rim segments in a radial direction to guard against an emergency, for instance when a tire bursts (page 2, lines 19–21).

Commercial applications of the prior art are of the type TUBLEX ® for endless rims, are of the type UNILEX ® where a plurality of rim parts are used, and are of the construction TRILEX ® where specifically only three segmental rim parts are used.

The construction of the afore-described prior art are such that the last-named construction TRILEX ® is relatively safe, however this type of rim has no counterpart for wheel bodies of the U.S.-28° type.

SUMMARY OF THE INVENTION

It is therefore one of the principal objects of the present invention to provide a segmental rim especially for use on a wheel body of the U.S.-28° type.

It is another object of the present invention to devise a rim where the restraining ring is unweakened by any holes, namely is, solid, and which has a high tensile strength. The ring being devoid of any openings to weaken it, thus permits a proper equilibrium to be obtained, on the one hand, between the urging force applied to the rim parts from a power device that urges the rim parts radially outwardly and, respectively, the restraining force applied to the rim parts by a restraining ring due to its tensile stress.

This object is attained in a vehicle wheel for use in carrying a tubed tire which includes a wheel body, a rim which has a plurality of segmental rim parts, a solid retaining ring of high tensile strength which engages all of the rim parts along one side thereof, cam and cam follower means intermediate the rim parts and the wheel body and operable when powered to urge the rim parts outwardly, and power means connected to the wheel body which are operable for actuating the cam and cam follower means to urge the rim parts radially outwardly into a final position. The ring restrains any outward movement of the rim parts beyond the final position, as there is established in the final position an equilibrium between the urging force applied to the rim parts from the power means, and, respectively, the restraining force applied to the rim parts by the ring due to its tensile stress.

Other objects of the invention will in part be obvious, and will in parts appear hereinafter, the same being illustrated in the accompanying drawings described in the specification.

BRIEF DESCRIPTION OF THE DRAWINGS

For a full understanding of the nature and objects of the invention, reference should be had to the following detailed description, taken in connection with the accompanying drawings in which.

DESCRIPTION OF THE PREFERRED EMBODIMENTS

Figure 1:
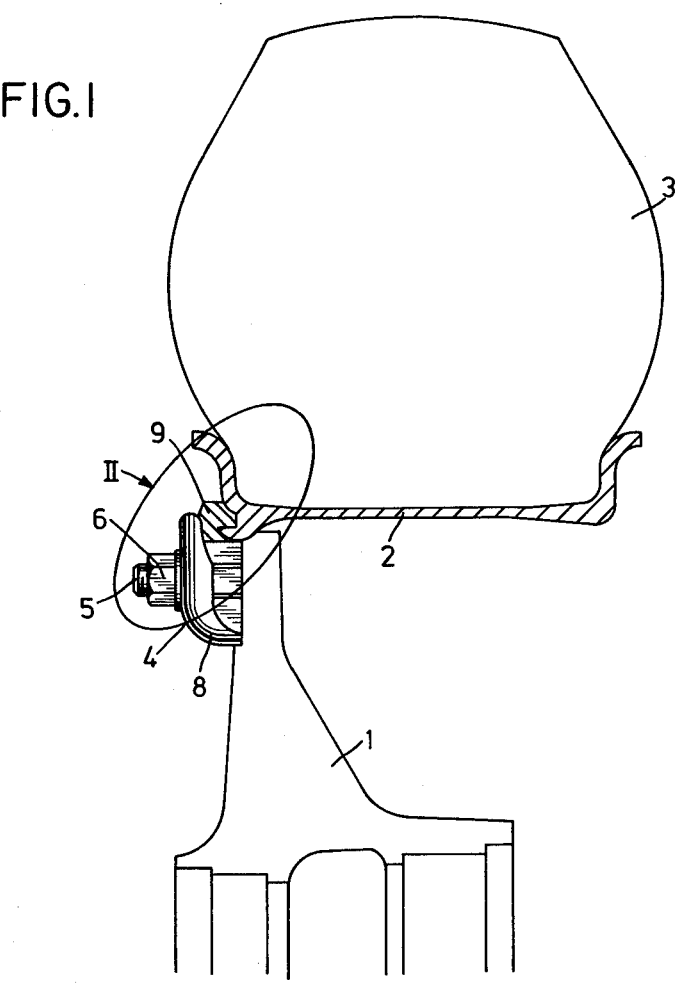
FIG. 1 is a fragmentary sectional view of a vehicle wheel built in accordance with the instant invention.

Referring now to the drawings, there is shown in fragmentary cross-section a wheel body 1 defining an axis 1', the wheel body 1 including a rim 2 and a tire 3 secured thereto. The rim 2, which includes a plurality of segmental rim parts abuts the wheel body 1, and, is secured to the wheel body 1 with the aid of a solid retaining rim 9, cam and cam follower means, such as, for example the inner circumferential surface 13 of the rim 2, and a corresponding outer circumferential surface 7 of the wheel body 1 intermediate the rim parts 2 and the wheel body 1, and power means connected to the wheel body 1, such as, for example, a threaded bolt 5, a nut 6, and a clamping plate 8.

Figure 2:
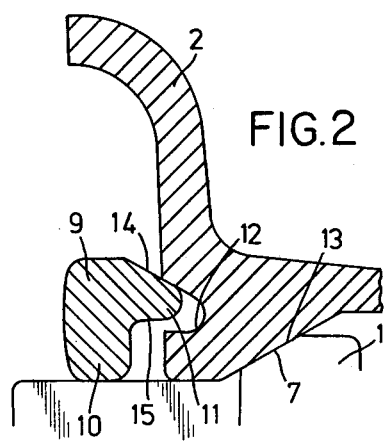
FIG. 2 is a large-scale fragmentary sectional view, at an instant before rim is secured to the wheel.
Figure 3:
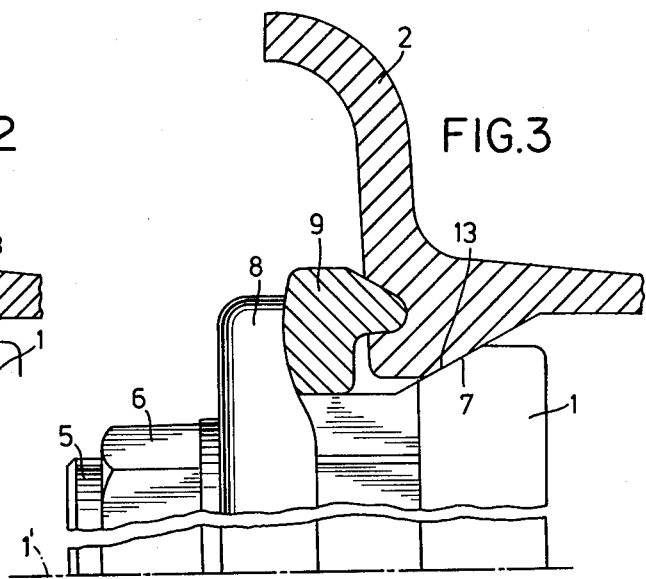
FIG. 3 is a large-scale fragmentary sectional view similar to FIG. 2, but showing a detail of the rim and the restraining ring in the final position.

The construction shown in FIGS. 2 and 3 is particularly appropriate where in the absence hereof, the rim diameter would be reduced on one side upon applying pressure on the rim by an air-inflated tire.

In FIGS. 2 and 3 there are shown camming and camming follower means, which are implemented, for example, in the shape of the retaining ring 9 being formed with a radially inwardly facing projection 10, and with an axially outward-facing annular projection 11 engaging a corresponding annular groove 12 formed in the rim 2 by virtue of a segmental groove being formed in each of the rim parts, and wherein the segmental grooves communicate with one another to merge into the annular groove 12. It will be seen that the power means consisting of the threaded bolt 5, the nut 6, and the clamping plate 8 are connected to the wheel body, and are operable for actuating the cam in the form, for example, of the inner circumferential surface 13 of the rim 2, and the cam follower means, for example, in the form of an outer circumferential surface 7 of the wheel body 1, to urge the rim parts comprising the rim 2, in an outward direction so as to form an angle of about 28° with the axis 1', as a result of the axially outwardly facing annular projection 11 of the retaining ring 9 engaging the groove 12 of the rim 2; in the final position, in an outward direction so as to form an angle of about 28° with the axis 1', shown in FIG. 3, the retaining ring 9 restrains any outward movement of the rim parts comprising the rim 2 beyond its final position, so that there is established in the final position an equilibrium between the urging force applied to rim parts from the power means, and, respectively, the restraining force applied to the rim parts by the tensile force arising in the retaining ring 9.

Figure 4:
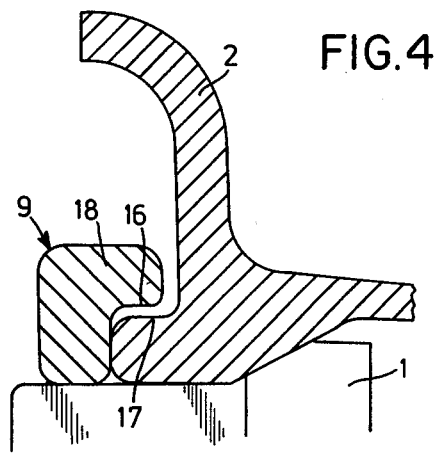
FIG. 4 is a large-scale sectional view, similar to FIG. 2, but embodying a modification.
Figure 5:
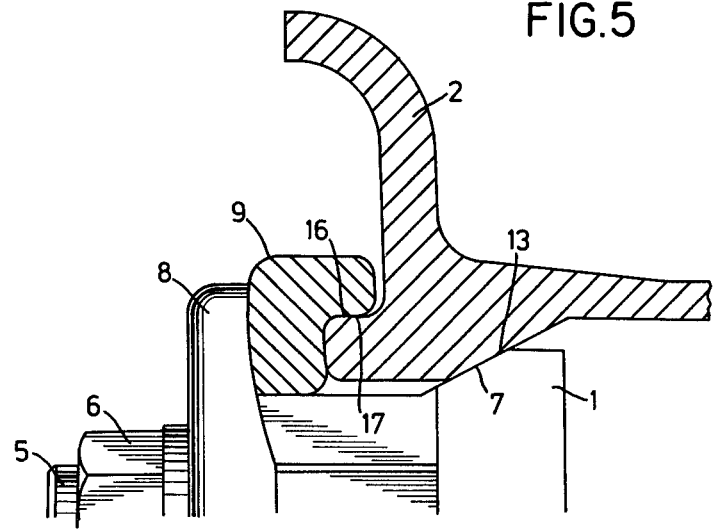
FIG. 5 is a large-scale sectional view similar to FIG. 3, but embodying the modification of FIG. 4.

An alternate version of the invention, corresponding to that shown in FIGS. 2 and 3, is shown in FIGS. 4 and 5. Upon the nut 6 being tightened, the clamping plate 8 urges the retaining ring 9 to move in an axial direction towards the rim 2, so that, as the final position is being approached, the rim parts comprising the rim 2 are being pushed to their right, the inner circumferential surface 13 of the rim 2 sliding vertically outwardly on the outer circumferential surface of the wheel body 1, thus inducing a tensile stress along the peripheral portion of the retaining ring 9. Equilibrium is attained when the urging force applied to the rim parts 2 from the power means, in this case by tightening of the nut 6, equals the restraining force applied to the rim parts 2 by the retaining ring 9 due to the increasing tensile stress therein, as it is being shifted rightward and is consequently forced to expand radially.

Figure 6:
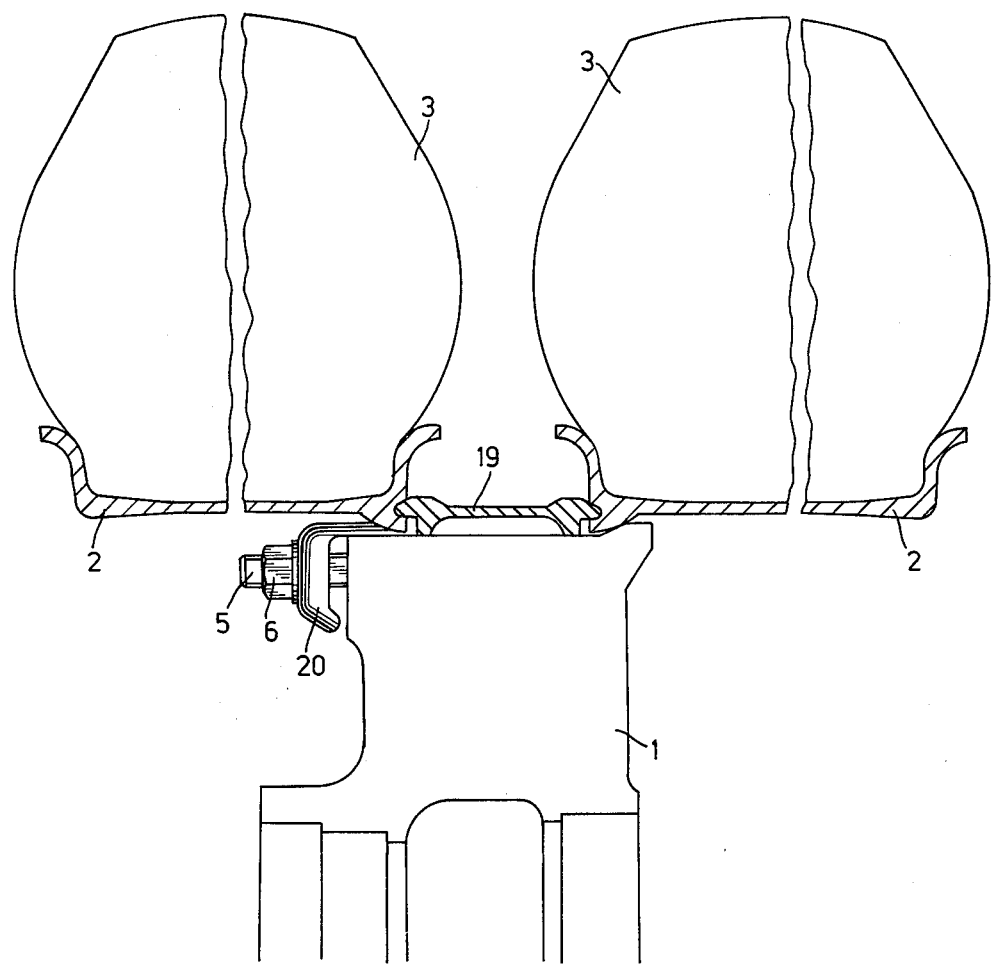
FIG. 6 is a fragmentary sectional view corresponding to that of FIG. 1, embodying a further modification to accommodate dual tires.

In FIG. 6 there is shown an embodiment employing two tires; the embodiment in FIG. 6 differs from that shown in FIGS. 1 through 3 only by the use of a common retaining ring 19, and the use of a clamping bracket 20 instead of a clamping plate 8. The retaining ring 19 may be implemented, for example, by two standard retaining rings 9 connected to one another by a common member, such as a rod or sleeve.

Upon tightening the nut 6, the clamping bracket 20 urges the two rims 2 to move towards one another, so that the facing parts of the rims 2 are simultaneously expanded in a radial direction, and also properly centered.

The groove 12 in the rim 2 may be an annular groove extending along the entire circumference of the rim 2, or may consist of individual groove segments in each segmental rim part, which merge into an annular groove when the individual rim parts abut one another.

Figure 7:
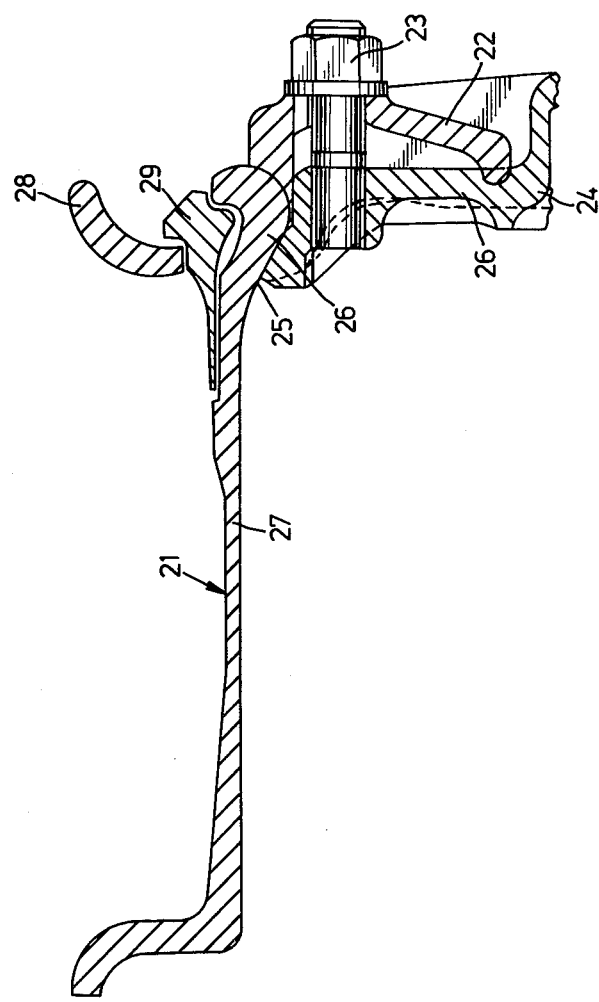
FIG. 7 is a fragmentary sectional view of a rim of the prior art, showing how the rim is secured to the vehicle body.

There is shown in FIG. 7, for the purpose of illustrating the prior art, a rim 21 of the conventional U.S. 28° type construction, which is secured to the wheel body 24 by means of a clamping plate 22 and a nut 23. A circumferential surface 25 having a inclination of 28° of the rim 21 is pressed against a circumferential surface 26 of the wheel body 24 by means of the clamping plate 22 and the nut 23. Here it is unimportant whether the rim 21, as shown in cross section, consists of three rings 27, 28, and 29, or is unitary. It is to be noted that securing the rim 21 to the wheel body 24 does not present any problems, as the rim 21, which is either unitary, or consists of three rings 27, 28, and 29, is not subdivided into separate segmental rim parts along its circumferential direction, so that the rim 21 is absolutely rigid. Rims of this type can therefore be secured to the wheel body 24 of the type shown without any problem, as this circumferentially undivided form of the rim 21 does not permit any significant expansion in a radial direction. The circumferential surface 26 of the wheel body, and the circumferential surface 25 of the rim 21 may be inclined, for example, at an angle of 28°.

Figure 8:
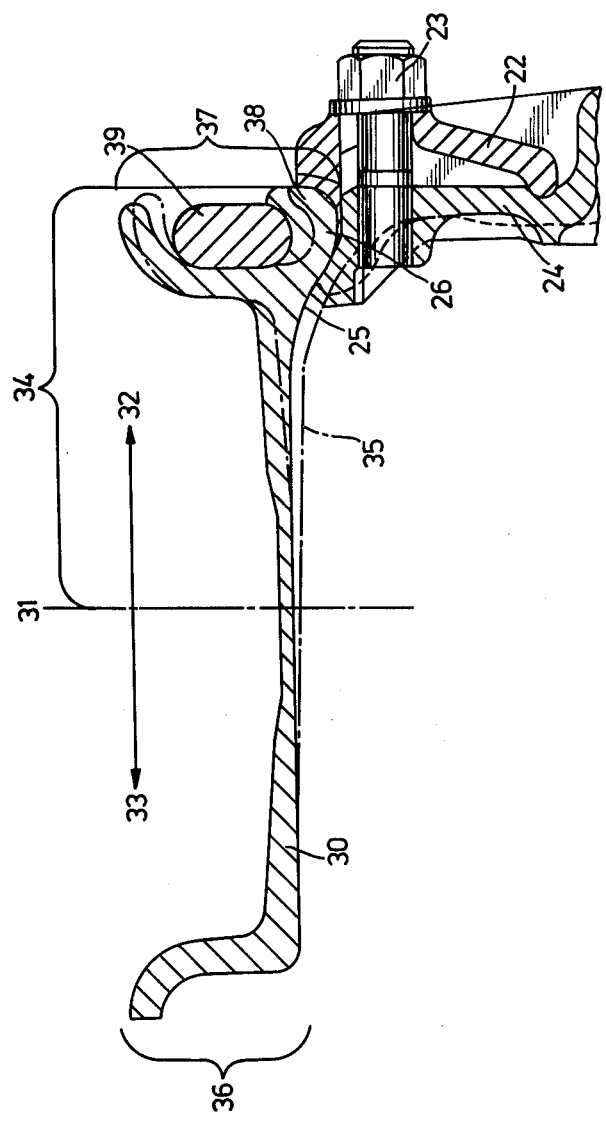
FIG. 8 is a fragmentary sectional view of a vehicle wheel embodying a still further modification.

If, however, as shown in FIG. 8, a rim consisting of a plurality of segmental rim parts is to be mounted on the same wheel body 24, problems arise, because the rim 30 is subdivided, for example, along three circumferential portions substantially parallel to the axis of the wheel, as is, for example, illustrated in FIG. 1 of the Mijnssen reference. It should be noted that the rim 30 is not only subdivided, but that the width of the gap between individual segmental rim parts varies along the width of the rim, for example widens in an axial direction away from the center line 31 of the rim in the direction of the arrow 32. While the individual gaps are very narrow, or almost non-existent, as the segmental rim parts abut one another along the portion of the width of the rim facing away from the center line 31 in the direction of the arrow 33, the gaps between the segmental rim parts 34, namely to the right of the center line 31 along the direction of the arrow 32, may have a width, for example, of 3 mm, as long as no air is pumped into the tire. Upon the tire being inflated with air, each gap within the circumferential width portion 34 is narrowed, so that the rim 30 is deformed and radially compressed into a shape shown in dash-dotted lines as 35 in FIG. 8. This means that the outer diameter of the rim, consisting of a plurality of segmental rim parts, is smaller at the outer side 37 of the wheel compared to the inner side 36 of the wheel. Wheel bodies of the type 24 are therefore provided, where segmental rim parts are to be mounted thereon, in addition to the inclined circumferential surface 26 with stop means, to prevent there occurring any excessive stress in the rim, which would otherwise deform the wheel circumference from its desired shape of a circle.

No stop means of this type are provided for circumferentially undivided rims 21 shown in FIG. 7, which are required to be secured to a wheel body of the type 24. But in order to secure segmental rim parts 30 also to wheel bodies of the type 24, shown in FIG. 8, it is necessary to introduce measures to prevent any excessive stressing of the rim 30 in a radially inward direction, when it is mounted on the wheel body 24. For this purpose the rim 30, consisting of a plurality of segmental rim parts, is provided on the outer side of the wheel with an annular groove 38 of approximately C-shaped cross section, so that it can receive stop means, for example a retaining ring 39, which extends along the entire periphery of the rim. The retaining ring 39 is installed when air is pumped into the tire, so that the rim's circumference near the outer side of the wheel is thereby reduced.

When mounting the rim 30, consisting of individual segmental rim parts, on the wheel body 24, the retaining ring 39 engages the annular groove 38 and is retained therein.

By this measure it is possible to mount the rim 30, consisting of individual segmental rim parts, on a wheel body 24, which has originally been designed to accommodate only a unitary, circumferentially undivided rim of the type 21. Therefore it is possible to mount either a unitary rim, or a rim consisting of a plurality of segmental rim parts on a wheel body, upon which hitherto only a unitary rim could be mounted.

The retaining ring 39 is normally made of steel, and the groove 38 can be readily implemented for example, by a rolling operation.

Figure 9:
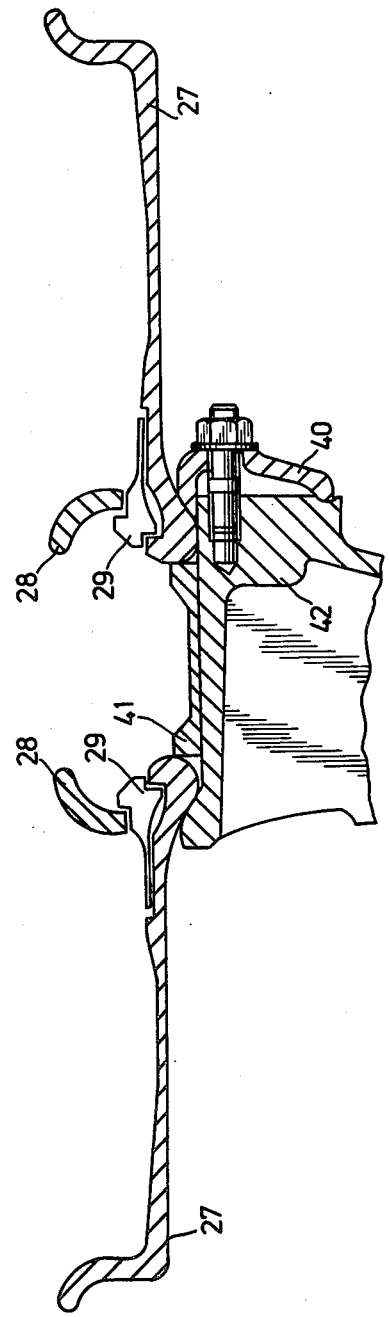
FIG. 9 is a fragmentary sectional view of a vehicle wheel of the prior art for mounting dual tires.

FIG. 9 is a fragmentary cross-section of a vehicle wheel of the aforedescribed type of the prior art for two tires, the rim 27 being unitary.

Figure 10:
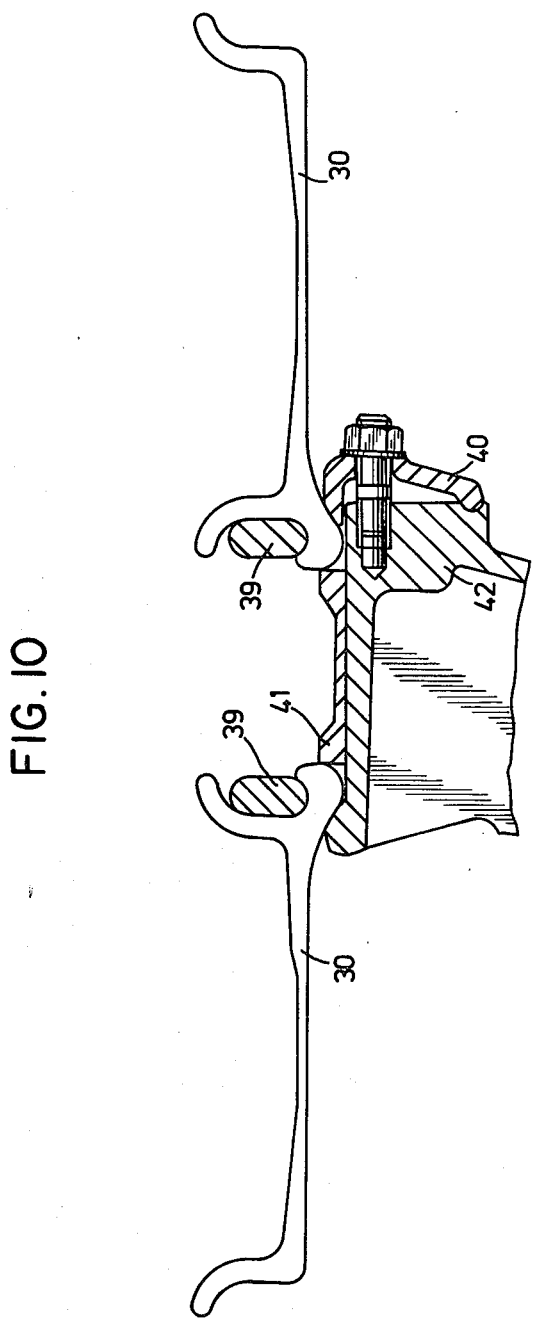
FIG. 10 is a fragmentary sectional view of a vehicle wheel similar to FIG. 6 using dual tires, but embodying the general modification of FIG. 8.

FIG. 10 is a vehicle wheel, according to the present invention, for a rim 30, which includes a plurality of segmental rim parts.

Instead of a clamping plate 22 shown in FIGS. 7 and 8, there is shown in FIGS. 9 and 10 a clamping bracket 40 replacing the clamping plate 22 of FIGS. 7 and 8. A retaining ring 41 is shown in both FIG. 9 and FIG. 10. In FIG. 9 the retaining ring 41 abuts each rim 30, where each rim 30 includes a plurality of segmental rim parts. It will be understood that an identical retaining ring 41 can be used both for a unitary rim 27, as well as for a rim 30 having a plurality of segmental rim parts.

The term "wheel body" includes both spider-shaped wheel bodies, as well as wheel bodies including an outer annular ring, although spider-shaped wheel bodies are used more frequently in practice. Spider-shaped wheel bodies are directly slid onto the wheel shaft, and are provided with spokes, and the rim is mounted directly onto the spokes.

Wheel bodies including annular outer rings are, however, mounted on a hub, the rim being installed on the outer circumference of the annular outer ring. In the case of a spider-shaped wheel body, the groove 38 may not necessarily be an annular groove, but can exist at connecting locations with the spokes of the spider-shaped wheel body.

In order for the retaining ring to remain securely connected to a wheel on which an air-inflated tire is mounted, even if the wheel is not installed on a wheel body and is used, for example, as a spare wheel, the retaining ring may have a slightly eliptical configuration. Upon mounting the rim, including a plurality of segmental rim parts on the wheel body, the retaining ring then snaps back into a circular configuration.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A vehicle wheel, for use in carrying a tire comprising in combination
a wheel body,
a rim composed of a plurality of segmental rim parts,
a solid retaining ring of high tensile strength engaging all of said rim parts along one side thereof,
cam and cam follower means intermediate said rim parts and said wheel body and operable to urge said rim parts radially outwardly,
power means connected to said wheel body and being operable for actuating said cam and cam follower means to urge said rim parts radially outwardly into a final position, said ring restraining any outward movement of said rim parts beyond said final position, there being established in said final position an equilibrium between the urging force applied to the rim parts from the power means and, respectively, the retraining force applied to the rim parts by the ring due to its tensile stress,
a second rim including second rim parts, said second rim being adjacent, though spaced from said first rim and similar thereto, and
a second retaining ring similar to the first retaining ring, said second retaining ring engaging all of the rim parts of said second rim and facing the first retaining ring.

2. A vehicle wheel as claimed in claim 1, further comprising a second rim for a second tire, said second rim including second rim parts, said second rim being adjacent, though spaced from the first rim and similar thereto, said retaining ring operatively interengaging all of said rim parts of both rims upon said power means actuating said cam and cam follower means.

3. A vehicle wheel as claimed in claim 1, wherein said retaining ring is deformable between a circular shape and an elliptical shape.

4. A vehicle wheel as claimed in claim 1, wherein said rim has an inner circumferential surface, and said wheel body has an outer circumferential surface slidable along said inner circumferential surface, whereby said rim may attain said equilibrium position while sliding along said inner circumferential surface upon said power means operatively urging said retaining ring to move axially towards said rim to engage, and to push said rim in said axial direction along said outer circumferential surface.

5. A vehicle wheel as claimed in claim 1, wherein each retaining ring has a round cross-section, and each rim partially surrounds the corresponding retaining ring.

6. A vehicle wheel as claimed in claim 1, further comprising camming and camming follower means adjacent said wheel body.

7. A vehicle wheel as claimed in claim 6, wherein said retaining ring includes said camming means, and said rim parts include said cam follower means.

8. A vehicle wheel as claimed in claim 7, wherein said camming follower means includes a substantially annular groove on a side thereof facing said camming means, and wherein said camming means includes an axially outwardly facing annular projection engaging said annular groove and is axially slidable on said wheel body.

9. A vehicle wheel, for use in carrying a tubed tire, comprising in combination a wheel body defining an axis, a single rim normally abutting said wheel body, and being composed of a plurality of separate segmental rim parts along its circumferential direction, said wheel body having a circumferential surface inclined at an acute angle with said axis and being free of any projection on said circumferential surface restraining any movement of said rim in an outward direction, said inclined surface defining a cam, a solid retaining ring of high tensile strength engaging all of said rim parts along one side thereof, cam follower means defined on said rim intermediate said rim parts and said wheel body and operable with said cam to urge said rim parts along said outward direction, and power means connected to said wheel body and being operable for actuating said cam and cam follower means to urge said rim parts radially outwardly into a final position, said ring restraining any outward movement of said rim parts beyond said final position, there being established in said final position an equilibrium between the urging force applied to the rim parts from the power means and, respectively, the restraining force applied to the rim parts by the ring due to its tensile stress.

10. A vehicle wheel, as claimed in claim 9, wherein said acute angle is at least 28°.

* * * * *